(12) United States Patent
Rudy et al.

(10) Patent No.: US 10,846,162 B2
(45) Date of Patent: Nov. 24, 2020

(54) SECURE FORKING OF ERROR TELEMETRY DATA TO INDEPENDENT PROCESSING UNITS

(71) Applicant: Oracle International Corporation, Redwood City, CA (US)

(72) Inventors: David Rudy, Stoneham, MA (US); Robert Hueston, Stoneham, MA (US); Scott Cooke, West Townsend, MA (US); Paul Mitchell, Lynnfield, MA (US)

(73) Assignee: Oracle International Corporation, Redwood City, CA (US)

(*) Notice: Subject to any disclaimer, the term of this patent is extended or adjusted under 35 U.S.C. 154(b) by 231 days.

(21) Appl. No.: 16/204,615

(22) Filed: Nov. 29, 2018

(65) Prior Publication Data

US 2020/0174875 A1    Jun. 4, 2020

(51) Int. Cl.
*G06F 11/00*   (2006.01)
*G06F 11/07*   (2006.01)

(52) U.S. Cl.
CPC ...... *G06F 11/0778* (2013.01); *G06F 11/0724* (2013.01); *G06F 11/0751* (2013.01)

(58) Field of Classification Search
CPC ............. G06F 11/0778; G06F 11/0724; G06F 11/0751
See application file for complete search history.

(56) References Cited

U.S. PATENT DOCUMENTS

| | | | | |
|---|---|---|---|---|
| 6,510,521 B1* | 1/2003 | Albrecht | ............ | G06F 12/1466 713/193 |
| 8,086,585 B1* | 12/2011 | Brashers | ............ | G06F 16/1774 707/705 |
| 9,092,632 B2* | 7/2015 | Wishman | ................ | G06F 21/64 |
| 9,235,719 B2* | 1/2016 | Neve De Mevergnies | ................ | G06F 21/572 |
| 9,477,545 B2* | 10/2016 | Guo | .................... | G06F 11/0793 |
| 9,535,782 B2 | 1/2017 | Agrawal | | |
| 9,779,242 B2* | 10/2017 | Henry | ................... | H04L 9/0643 |
| 10,353,763 B2* | 7/2019 | Song | .................... | G06F 11/0751 |
| 2012/0117429 A1 | 5/2012 | Zhang | | |
| 2012/0233472 A1* | 9/2012 | Faraboschi | ......... | G06F 12/1466 713/190 |

(Continued)

*Primary Examiner* — Elmira Mehrmanesh
(74) *Attorney, Agent, or Firm* — Snell & Wilmer LLP; Kent A. Lembke (57) ABSTRACT

Utilities (e.g., systems, methods, etc.) that make use of a secure input/output (I/O) channel between system firmware (e.g., BIOS) and the SP to allow the BIOS to securely send data (e.g., error data) for secure consumption by the SP while preventing or limiting other sources from sending falsified data or the like the SP. The secure I/O channel includes interface hardware (e.g., Field-programmable gate array (FPGA)) that is configured to be unlocked by the BIOS using a security key received from a key generator over a separate security channel. After such data is securely sent to the interface hardware, the BIOS may then pass error interrupt(s) to the OS for performing of any necessary recovery actions. At any appropriate time, the SP may read or consume error data from the memory register of the interface hardware and perform any appropriate diagnoses and/or handling of the error data.

35 Claims, 4 Drawing Sheets

(56) References Cited

U.S. PATENT DOCUMENTS

| | | | |
|---|---|---|---|
| 2013/0111168 A1* | 5/2013 | Circello | G06F 9/526 |
| | | | 711/163 |
| 2013/0227139 A1* | 8/2013 | Suffling | H04L 9/3226 |
| | | | 709/225 |
| 2014/0075567 A1* | 3/2014 | Raleigh | G06Q 20/20 |
| | | | 726/26 |
| 2015/0089287 A1* | 3/2015 | Jayakumar | G06F 12/0802 |
| | | | 714/23 |
| 2017/0249223 A1* | 8/2017 | Sherlock | G06F 11/2094 |
| 2018/0341774 A1* | 11/2018 | Yao | G06F 21/44 |
| 2019/0087578 A1* | 3/2019 | Govindarajan | G06F 21/602 |

\* cited by examiner

SECURE FORKING OF ERROR TELEMETRY DATA TO INDEPENDENT PROCESSING UNITS

BACKGROUND

1. Field of the Invention

The present invention generally relates to the field of diagnosing and handling computing system errors and, more particularly, to distributing system errors to different processing units for diagnoses and handling.

2. Relevant Background

To increase computer uptime, system designers often build various types of reliability, availability, serviceability, and manageability features to improve overall system reliability and availability. It is therefore common to find various degrees of redundancy, error correction, error detection and error containment techniques employed at different levels in such a system. One of the most common types of computer system failures is attributed to processor and/or system memory errors (e.g., machine-check exceptions (MCEs), Peripheral Component Interconnect Express (PCIe) errors, transient errors, etc.) as they can cause a computing system to malfunction if they are handled improperly.

Computing systems typically have a Baseboard Management Controller (BMC) to provide management and monitoring capabilities independently of the host system's central processing unit (CPU), firmware (e.g., Basic Input/Output System (BIOS), Unified Extensible Firmware Interface (UEFI)) and operating system (OS). For instance, the BMC may include a service processor (SP) (e.g., hardware, software such as Oracle's Integrated Lights Out Manager or (ILOM)) that is configured to detect abnormal conditions in system parameters (e.g., in relation to temperature, voltage, current, fan speeds, OS parameters), log events, and generate notifications to allow administrators to take corrective actions.

SUMMARY

While the host OS is typically configured to perform error handling steps such as page retire and the like in the case of many system memory errors, the SP is often better configured to diagnose the errors as it is typically not affected by the system memory errors. In some arrangements, low-level, intelligent firmware can more accurately diagnose and/or handle errors so that higher levels of the system (e.g., hypervisor, OS) can conserve resources (extra cycles) for other system functions. However, the firmware is unable to securely send such error data to an SP for diagnosis and/or handling and thus unable to avoid, for instance, spoofing of the BIOS by the OS (or drivers or applications running in the OS) which may otherwise confuse the SP into faulting perfectly good hardware.

In this regard, disclosed herein are systems and methods ("utilities") that make use of a secure input/output (I/O) channel between the BIOS and the SP to allow the BIOS to securely send data (e.g., error data) for consumption by the SP while preventing or limiting other sources from sending falsified data or the like to the SP. As will be discussed more fully herein, the secure I/O channel includes interface hardware (e.g., Field-programmable gate array (FPGA)) that is configured to be unlocked by the BIOS using a security key received from a key generator over a separate security channel. After the interface hardware has been unlocked, the BIOS may be configured to write error telemetry data (e.g., memory bank number, memory error type, etc.) received from one or more memory banks in any appropriate format (e.g., 32-bit) to the interface hardware after which the BIOS may relock the interface hardware (e.g., using any appropriate key or code) to inhibit other system components or processes from accessing the interface hardware. The interface hardware may then queue the received error data into a memory register (e.g., first in first out (FIFO) memory) of the interface hardware for consumption by the SP. The BIOS may then pass error interrupts to the OS for performing of any necessary recovery actions. In this regard, error telemetry data may be securely forked to independent processing units (e.g., the SP and the OS). At any appropriate time, the SP may read or consume error data from the memory register of the interface hardware and perform any appropriate diagnoses and/or handling of the error data.

In one aspect, a method for use in managing errors in a computing system includes receiving, at a firmware chip of a computing system from a processor of the computing system, at least one interrupt regarding at least one error event of the computing system; writing, by the firmware chip, an unlock key to a first port of interface hardware of the computing system; reading, by the firmware chip, data regarding the at least one error event stored in one or more memory banks of the computing system; writing, by the firmware chip, the error event data to a second port of the interface hardware after the reading; and writing, by the firmware chip, a lock key to the first port of the interface hardware after writing the error event data to the memory register of the interface hardware, where the error event data written to the second port of the interface hardware is available for consumption by a service processor of the computing system for diagnosis of the at least one error event.

In another aspect, a computing system includes a memory device including a plurality of memory banks, where each memory bank includes a plurality of registers that are configured to record metrics regarding the computing system; a processor that is configured to detect error events on the computing system and generate interrupts in response to detected error events; a firmware chip including an interrupt handler that is configured to receive interrupts from the processor regarding the detected error events; a service processor that is configured to diagnose the detected error events; and a field-programmable gate array (FPGA) communicatively interposed between the firmware chip and the service processor to facilitate consumption of the data regarding the error events by the service processor.

In a further aspect, a method for use in a computing system includes receiving data at a first port of interface hardware of a computing system; determining, in response to the receiving, that a particular unlock key has previously been received at a second port of the interface hardware; queueing, in response to the determining, the received data into a first in first out memory device of the interface hardware; and allowing the queued data to be consumed by management software of a service processor of the device.

In addition to the exemplary aspects and embodiments described above, further aspects and embodiments will become apparent by reference to the drawings and by study of the following descriptions.

DETAILED DESCRIPTION

The present disclosure is generally directed to various utilities (e.g., systems, methods, etc.) that make use of a secure input/output (I/O) channel between system firmware (e.g., BIOS) and the SP to allow the BIOS to securely send data (e.g., error data) for secure consumption by the SP while preventing or limiting other sources from sending falsified data or the like to the SP. The secure I/O channel includes interface hardware (e.g., Field-programmable gate array (FPGA)) that is configured to be unlocked by the BIOS using a security key received from a key generator over a separate security channel. After such data is securely sent to the interface hardware, the BIOS may then pass error interrupt(s) to the OS for performing of any necessary recovery actions. At any appropriate time, the SP may read or consume error data from the memory register of the interface hardware and perform any appropriate diagnoses and/or handling of the error data.

Figure 1:
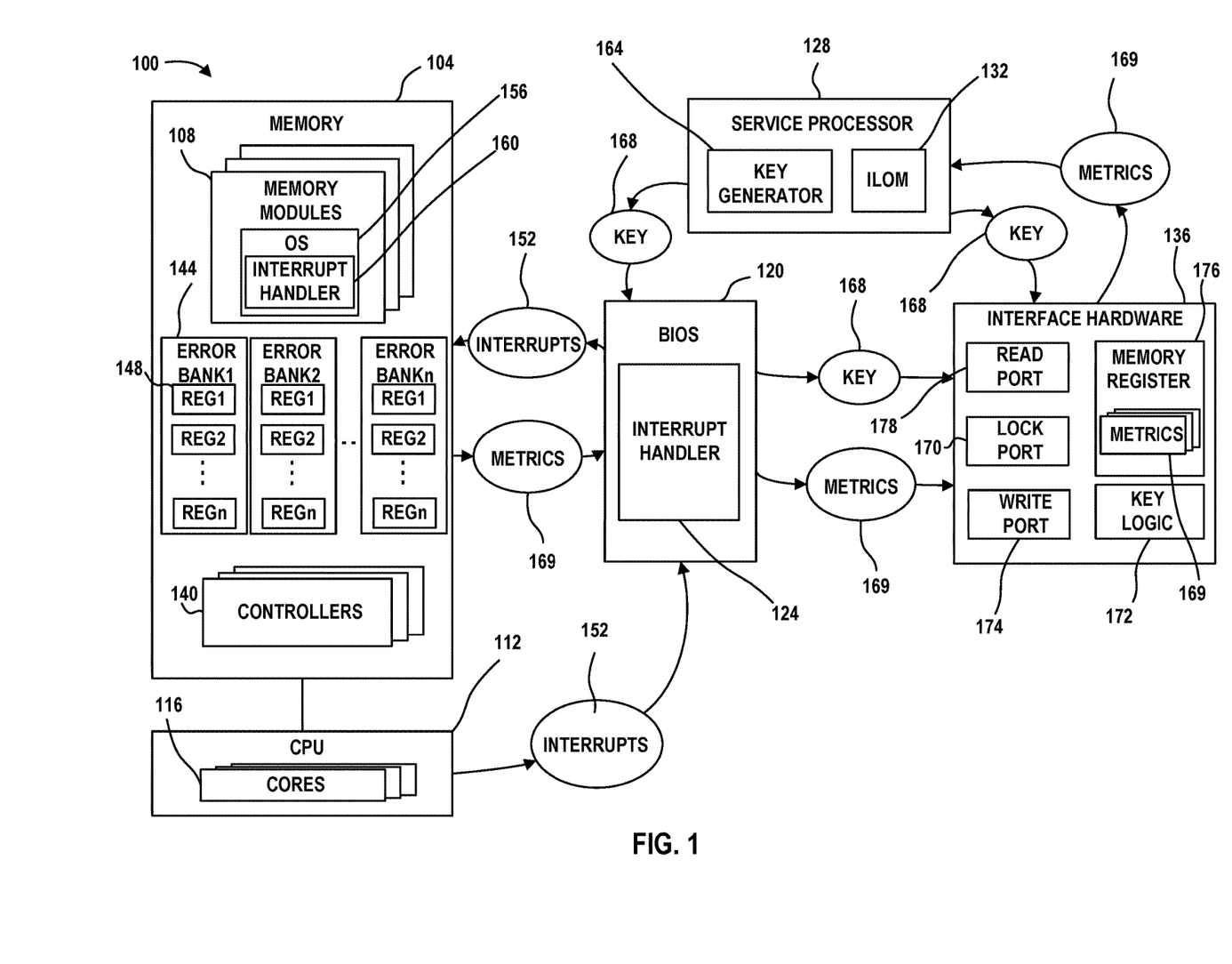
FIG. 1 is a schematic diagram of a system that allows computing system error event data to be securely sent and stored on interface hardware of the system for consumption by a service processor of the system.

FIG. 1 presents a schematic diagram of a computing system 100 that allows error event data accumulated in one or more error banks 144 to be securely sent and stored on interface hardware 136 of the system 100 for consumption by a service processor 128 of the system 100. Broadly, the system 100 may include a memory 104 (e.g., including, inter alia, one or more random access memory (RAM) or other volatile memory modules 108), a central processing unit (CPU) 112 (e.g., including one or more processing units or cores 116) for executing computer-readable instructions stored on the memory modules 108, a BIOS unit 120 configured to run any appropriate interrupt handler 124 (e.g., logic), and an SP 128 configured to run any appropriate management software for the system 100 such as Oracle's integrated lights out manager (ILOM) 132 or the like. Furthermore, the system 100 includes interface hardware 136 (e.g., FPGA chip) that is broadly configured to securely receive and store error event data from the BIOS unit 120 and make the same available for consumption by the SP 128 in a manner that limits attempts by other sources (e.g., operating system, drivers, applications, etc.) to send falsified data or the like to the SP 128. While not illustrated in the interest of clarity, the computing system 100 may also include various other components (e.g., peripheral components, interfaces, functionalities, buses, etc.).

Before discussing the interface hardware 136 and how the system 100 functions to securely send and store such error data, reference is now made to the memory 104 of the system 100. As shown, the memory 104 includes or is at least associated with a plurality of memory controllers 140 that are configured to facilitate access to the memory modules 108 by the CPU 112 and the like. Furthermore, the memory 104 includes a series of error banks 144, and each records various types of information regarding the memory modules 108 in a plurality of memory registers 148 such as status (e.g., type of error), address (e.g., address of memory module(s) 108), syndrome (e.g., error specific details), and/or the like, where each register 148 is indexed according to a particular one of the banks 144. For instance, the controllers 140 may be configured to populate the registers 148 of the banks 144 during execution of instructions by the CPU 112. In one arrangement, each register 148 may be configured to store information in 64-bit increments or the like.

Specifically, the memory 104 may store any appropriate OS 156 including an interrupt handler 160 that is configured to be executed by the CPU 112 for diagnosing and handling error events based upon an analysis of the information in the memory registers 148. In some prior systems, system interrupts 152 generated by the CPU 112 are addressed directly by the interrupt handler 160 of the OS 156 even when relatively lower level, but intelligent firmware (e.g., SP) may be better configured to diagnose the errors as it is typically not affected by the system memory errors. While some other prior systems do have the ability to send error interrupts received from the CPU to BIOS or the like for handling before passing the same to the OS, the BIOS in such systems does not have a way to send related error event data to the SP in a secure manner.

Figure 2:
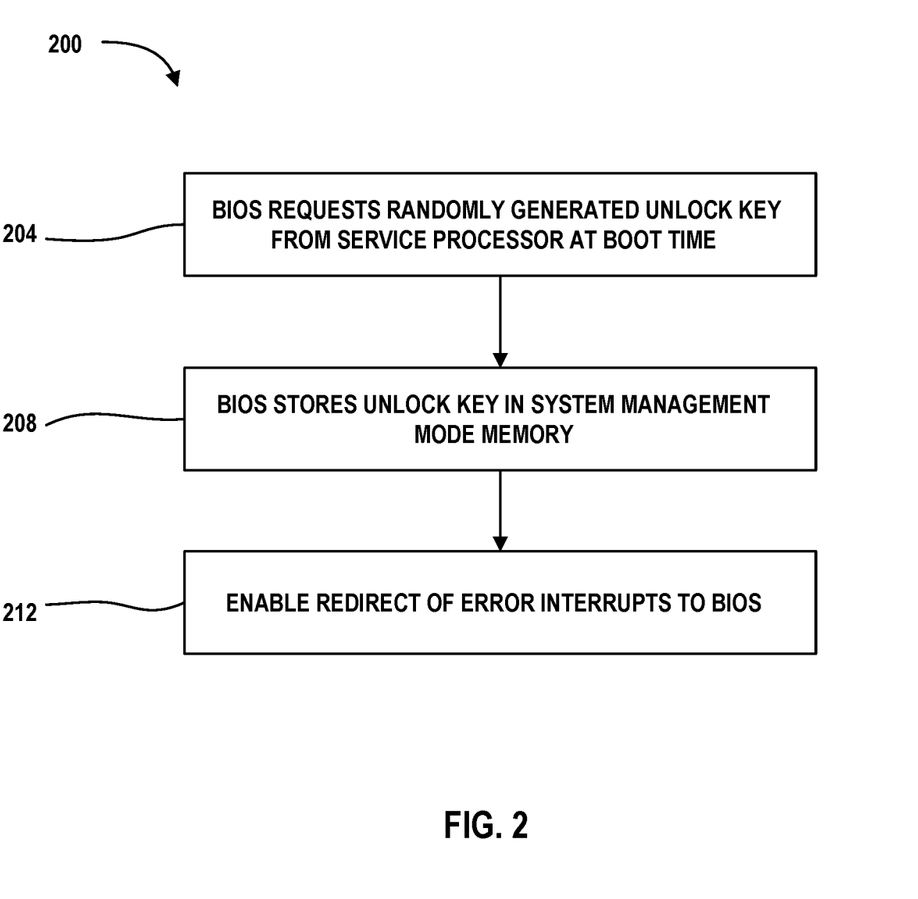
FIG. 2 is a flow diagram of a method of receiving a security key and enabling error interrupt redirection to BIOS at boot time of the computing system of FIG. 1.

Accordingly, the interface hardware 136 is configured to securely receive and store error event data for consumption by the SP 128 in a manner that limits attempts by other sources (e.g., OS, drivers, applications, etc.) to send falsified data or the like to the SP 128. With reference now to FIG. 1 and the method 200 of FIG. 2, the BIOS unit 120 may, at boot time, request 204 a randomly generated unlock key 168 (e.g., 64-bit) from the SP 128 (as generated by any appropriate number or key generator 164) and store 208 the same in system management mode (SMM) memory (not shown) (e.g., located on the BIOS unit) that may only be accessible at boot time and during a system management interrupt (SMI) mode of the system 100 as discussed below. The SP 128 may also send the same unlock key 168 to the interface hardware 136 to be used by logic 172 of the interface hardware 136 to compare against keys received from hosts (e.g., BIOS unit, etc.) as discussed below. The BIOS unit 120 may also enable 212 redirection of error interrupts 152 generated by the CPU 112 to the BIOS unit 120 rather than for immediate handling by the interrupt handler 160 of the OS 156. Additionally, the BIOS unit 120 may cloak (hide from the OS 156) all of the error banks 144. At this point, the system 100 may be considered "primed" for secure handling of error event data as disclosed herein.

Figure 3:
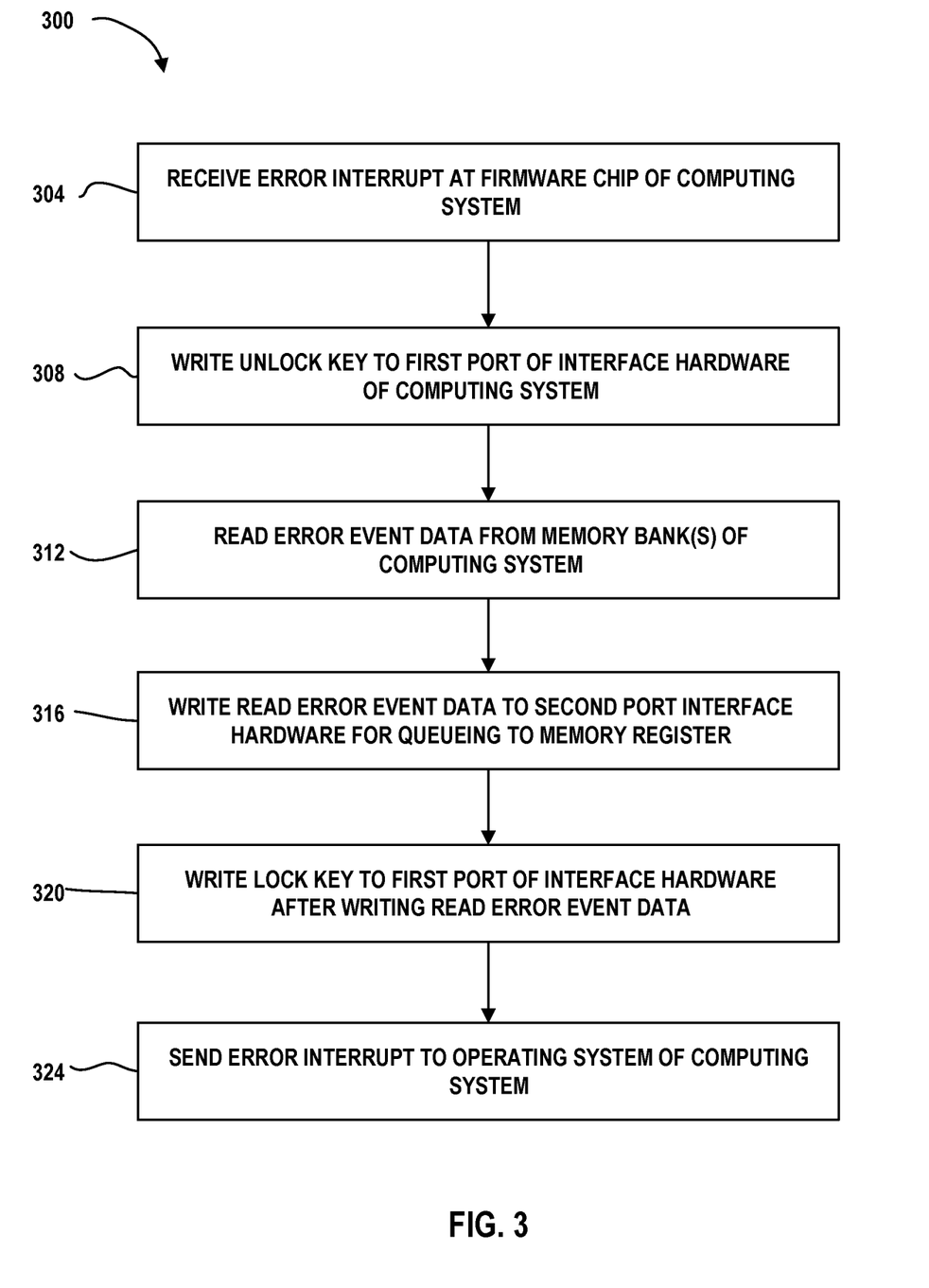
FIG. 3 is a flow diagram of a method of securely sending computing system error event data to the interface hardware of FIG. 1 for consumption by the system processor.

Additional reference is now made to FIG. 3 which illustrates a method 300 of securely sending computing system error event data to the interface hardware 136 for consumption by the SP 128. At 304, an interrupt handler 124 (e.g., SMI handler) of the BIOS unit 120 (e.g., firmware chip) may receive from the CPU 112 at least one interrupt 152 regarding a system error such as a machine check exception (MCE), a Peripheral Component Interrupt Express (PCIe) error, and/or the like. As mentioned above, the received interrupt 152 may be redirected in any appropriate manner from the OS 156 to the BIOS unit 120. Upon generation of the interrupt 152 by the CPU 112, all of the processing cores 116 may automatically enter SMM (e.g., whereby the OS 156 no longer has control) and an arbitrary thread is selected to run the interrupt handler 124 of the BIOS unit 120.

In any case, the interrupt handler 124 may, in response to receiving the interrupt 152, write 308 the unlock key 168 previously obtained at boot time from the SP 128 into a first lock port 170 (e.g., particular memory address, such as 0xC7C-0xC83) of the interface hardware 136. As one example, the writing 308 may include using out instructions to write two 32-bit segments of a 64-bit unlock key. In one arrangement, the interrupt handler 124 may communicate with the interface hardware 136 over any appropriate low pin count bus. Upon receipt of the unlock key 168, the logic 172 of the interface hardware 136 may confirm that it is the same as the key 168 received from the SP 128 at boot time.

The method 300 may then include reading 312 register metrics 169 (e.g., including error event data) from the error banks 144 of the memory 104 and then writing 316 the read metrics 169 into a separate second write port 174 (e.g., a particular memory address, such as 0xC78-0xC7B) for queueing into a memory register 176 (e.g., FIFO) of the interface hardware 136, whereupon the register metrics are ready for consumption by the ILOM 132 of the SP 128 at any appropriate time. In one embodiment, the interrupt handler 124 may determine the particular number of error banks 144 to be read by reading a counter (not shown) from the memory 104 or as hard-coded into the BIOS unit 120.

In some arrangements, register metrics 169 may not be readable from a particular error bank 144 until a corresponding hardware thread is run on the processing core 116 associated with the particular error bank 144. For each hardware thread run on processing core 116, the interrupt handler 124 may query its respective error bank 144 in relation to register metrics that may provide information regarding errors in the memory 104, processor cores 116, PCIe, and/or the like. In one embodiment, the interrupt handler 124 may first query for register metrics 169 regarding uncorrectable errors (UE) and then query for register metrics 169 regarding correctable errors (CE). In some situations, for instance, a large number of CEs may all stem from a single UE; accordingly, it may be more advantageous to query for and address UEs before doing so for CEs.

As discussed previously, each error bank 144 may be made up of a plurality of registers 148, each of which is configured to compile different respective metrics regarding one or more different memory modules 108, processing cores 116, etc. In one arrangement, the interrupt handler 124 may be configured to read and obtain metrics 169 from all registers 148 in all valid ones of the banks 144 for transmission to the interface hardware 136 as discussed below. In another arrangement, the interrupt handler 124 may be configured to only query metrics 169 from a subset of all of the registers 148 in all of the valid banks 144. As just one example, the interrupt handler 124 may be configured to query for metrics from a "status" register 148 (type of error), an "address" register 148 (e.g., address of memory module(s) 108), and a "syndrome" register 148 (e.g., type of memory error error-specific details) as the ILOM 132 may be configured to sufficiently diagnose the error event(s) from such metrics.

Upon retrieval of the appropriate register metrics 169 for each bank 144, the interrupt handler 124 may be configured to send such metrics 169 to the write port 174 of the interface hardware 136 for queueing to the memory register 176 and consumption by the ILOM 132. In one arrangement, the interrupt handler 124 may be configured to send the metrics 169 to the interface hardware 136 in the form of a stream of 32-bit "doublewords" or "DWORDs". In this regard, one exemplary data transport protocol that may be implemented by the BIOS unit 120 will now be discussed although other data formats and protocols are also envisioned and encompassed herein.

Each stream of DWORDs may be in the form a series of blocks, where each block includes the following plurality of DWORDs:
  a) Marker: All 0xFF's to mark start of a block.
  b) Header: 32-bit identification of the block contents:
    [31:24] Content length in DWORDs, not including header or cyclic redundancy check (CRC) (e.g., for type machine check architecture (MCA), three times the number of MCA registers 148 being sent). For example, when sending three register types for a given MCA bank 144, content length would be set to nine.
    [23:16] Content Type, 1=MCA, all other codes reserved.
    [15:0] Sequence ID, arbitrary sequence number. This could also be a random number.
  c) MCA Register Data:
    i) Bank:
      [31:24] Socket (0-1)
      [23:16] Core/Thread ID (0-63)
      [15:8] Bank ID
      [7:0] Register within bank (the below represent various types of the registers 148)
        0=CTRL
        1=STATUS*
        2=ADDR*
        3=MISCO
        4=CTRL_MASK
        5=CONFIG
        6=IPID
        7=SYND*
        8=DESTAT
        9=DEADDR
        10-13=MISC[1-4]
        14=TRANSSYND
        15=TRANSADDR
    ii) Lower 32-bits of MCA register
    iii) Upper 32-bits of MCA register
  d) CRC32, includes header and all content data.

The above exemplary protocol allows the interrupt handler 124 to send register metrics 169 made up of three DWORDs of address/data (e.g., 12 bytes) plus three DWORDs of overhead (e.g., header, CRC, and marker) or 24 bytes total. Similarly, a set of three banks 144 of error metrics could be sent with a single set of 12 bytes of overhead, or 48 bytes total.

The following is an exemplary routine that interrupt handler 124 of the BIOS unit 120 may implement for sending register metrics 169 to the write port 174 of the interface hardware 136:
  a) Send start-of-frame marker (e.g., one DWORD, all 0xFF's).
  b) Send header (e.g., 1 DWORD, with size nine DWORDS).
  c) Send MCA_STATUS (e.g., register "1" above, size three DWORDs).
  d) Send MCA_ADDR (e.g., register "2" above, size three DWORDs).
  e) Send MCA_SYND (e.g., register "7" above, size three DWORDs).
  f) Send CRC (e.g., size one DWORD)

Figure 4:
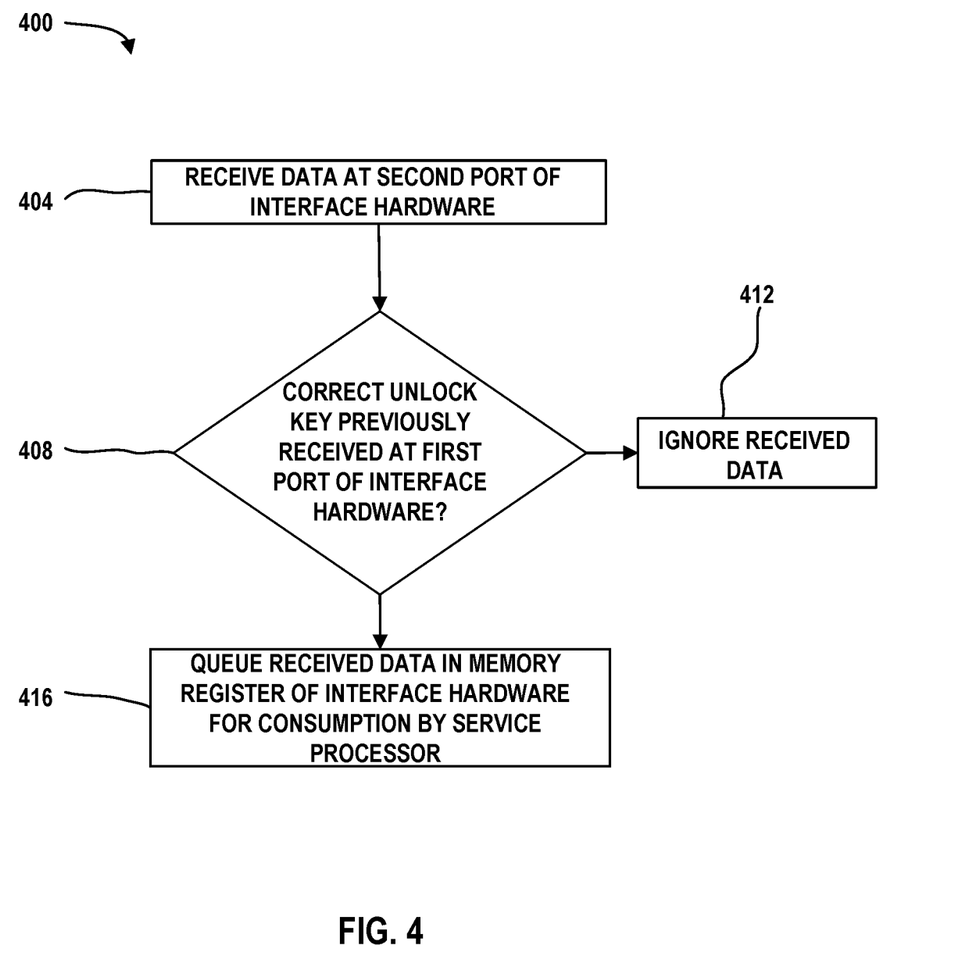
FIG. 4 is a flow diagram of a method of receiving data for storage on the interface hardware of FIG. 1.

Before further discussing the method 300 of FIG. 3, reference is now made to the method 400 of FIG. 4 which is implemented by the interface hardware 136 of the computing system 100. At 404, data is received at a second port (e.g., write port 174) of the interface hardware 136 whereupon the method 400 then includes querying 408 whether a correct unlock key 168 has been received at a first port (e.g., lock port 170) of the interface hardware 136. As discussed previously, this process may include key logic 172 of the interface hardware 136 comparing a key received at the lock port 170 to a previously stored key received from the SP 128 at boot time. In some arrangements, a yes answer to the query 408 may only arise when a correct key was received at the lock port 170 within a certain time period before data was received at the write port 174. In any case, a negative answer to the query 408 may result in the data being ignored by the interface hardware 136. Thus, as to applications, processes, drivers, and/or other hosts that are unaware of the particular unlock key previously stored in the interface hardware 136 and that send data or instructions (e.g., that may possibly be malicious) to the interface hardware 136 without such unlock key, any such data or instructions will be ignored 412 by the interface hardware 136. Furthermore, as the interface hardware 136 may be configured to not send any response messages or signals back to the sending host, such host may never know whether or not the data or instructions were ever received. In this regard, the write port 174 may be a one-way port that only allows for incoming writes but does not allow for outs away from the interface hardware 136.

Upon a positive answer to the query 408, the interface hardware 136 may be configured to queue 416 the received data (e.g., register metrics 169, such as a stream of DWORDs as discussed above) into a memory register 176 of the interface hardware 136 for consumption by the SP 128 at any appropriate time. Before discussing how the metrics 169 are queued into the memory register 176 for consumption by the SP 128, reference is made back to the method 300 of FIG. 3 whereby the interrupt handler 124 of the BIOS unit 120 may write 320 a lock key (e.g., different than the unlock key 168, such as a 64-bit string of 0's) into the lock port 170 to thereafter prevent data from being written into the write port 174 (e.g., until the correct unlock key 168 is subsequently received at the lock port 170). While not shown in FIG. 3, the interrupt handler 124 of the BIOS unit 120 may also uncloak the error banks 144 to again allow the OS 156 to "see" the banks 144. Thereafter, the interrupt handler 124 may send 324 the at least one interrupt 152 to the interrupt handler 160 of the OS 156 for handling in any appropriate manner. For instance, the interrupt handler 160 of the OS 156 may read metrics from the various registers 148 of the banks 144, perform any appropriate recover actions, and clear the metrics from the registers 148.

Returning to step 416 of FIG. 4, the memory register 176 of the interface hardware 136 may broadly be in the nature of a "write and forget" memory (e.g., one or more FIFO memory devices) that allows register metrics 169 (e.g., stream of DWORDs, etc.) to be queued therein and control of the interrupt 152 returned to the OS 156. The ILOM 132 of the SP 128 can thereafter read such metrics 169 from the memory register 176 at any appropriate time (e.g., which may not necessarily be immediately after the metrics were queued into the register 176). For instance, the memory register 176 may be sufficiently large enough to ensure that the interrupt handler 124 can send register metrics 169 (e.g., stream of DWORDs) from numerous (e.g., dozens or more) banks 144. Upon receipt of such metrics 169 at the write port 174, the interface hardware 136 may queue up the metrics 169 in the memory register 176 for consumption by the ILOM 132.

As an example, "depth" of metrics 169 from a single bank 144 may be:

$$= \text{Overhead} + 3 * \text{Register}$$

$$= 3DWORDs + 3 * (3DWORDs)$$

-continued $$= 12DWORDs$$

$$= 48 \text{ Bytes}$$

Accordingly, in order to be able to send metrics 169 from two dozen banks 144 of registers 148 in a single stream by the interrupt handler 124, the total depth of the memory register 176 may be:

$$= 24 * \text{Depth per Bank}$$

$$= 24 * 12DWORDs$$

$$= 288DWORDs$$

$$= 1152 \text{ Bytes}$$

Each FIFO device of the memory register 176 may in one arrangement be 32-bits wide and 512 entries deep or 2048 total bytes as an example. At any appropriate time, the ILOM 132 of the SP 128 may read or stream the data in the memory register 176 of the interface hardware 136 and scan the same until it sees a start-of-message marker. For instance, the ILOM 132 may access the interface hardware 136 via a third "read" port 178 (e.g., memory address) of a serial peripheral interface between the interface hardware 136 and the SP 128.

Thereafter, the ILOM 132 may then consume the header and register data, generate a CRC and compare it to the CRC being sent, and validate the marker, before accepting it as data from a valid one of the registers 148 from the interrupt handler 124. In the event there are errors validating the data, it is possible that the memory register 176 overran and data was lost. In this case, the ILOM 132 may then scan the data in the memory register 176 for the next marker then start processing the next block of DWORDs after such marker. In any case, the ILOM 132 may analyze the read data to diagnose the error event and take any necessary actions. In one arrangement, the ILOM 132 and OS 156 may take different (recovery) actions based on the register metrics 169 (where, as discussed herein, the ILOM 132 consumes the metrics from the memory register 176 of the interface hardware where the OS 156 in contrast consumes the register metrics 169 directly from the registers 148 of the banks 144).

Below is one exemplary set of registers that may be implemented by the interface hardware 136 for use by the ILOM 132 in consuming data from the memory register 176:

| Offset | Register |
|---|---|
| 0x00 | Control/Status Register (1 Byte)<br>[0] Enable/Disable Snooper. If re-enabled it will start from the last storage location.<br>1 = Enabled<br>[1] Reset Snooper (Clear what has been captured)<br>1 = Clear Snooper SRAM (Write Only) [2] Snooper SRAM full<br>1 = Full-(Read Only) [3] Snooper SRAM Empty<br>1 = Empty-(Read Only)<br>[4] Start Capture on Trigger Value [6:5] Trigger Offset (offset 0x0-0x3) [7] Reserved |
| 0x08 | SRAM Available Remaining (2 bytes) |

-continued

| Offset | Register |
|---|---|
| 0x10 | Trigger Value (1 Byte)<br>This will let you set a value for any of the 4 Bytes and when this is seen the FPGA will start capturing from that point on. Might be helpful in debug if getting flooded with RAS packets. The Trigger function is more for the RAS Port snooper to allow debug + storage from a particular event. The offset control will allow any portion of the RAS Port packet to be used as the trigger. |
| 0x20 | Snooper Data Read (4 Bytes)<br>Can be accessed as individual Bytes from 0x20-0x23 The Snooper will capture packets in 4 byte chunks. If not, all Bytes are sent then the unsent Bytes in that packet will be set to 0x0. The FPGA will maintain the Head/Tail pointers for the SAM access so all ILOM needs to do is read the Snooper data at address 0x20 and check the status to see if it is empty. If ILOM attempts to read from the Snooper when it is empty, it will read all Zeros so rather than reading the Status register every time it can just stop reading on a Zero read. |
| 0x30 | Lock Registers (8 Bytes)<br>This is what is set by the SP |
| 0x40 | Captured Lock Registers (8 Bytes)<br>This is what host sent the FPGA to try to unlock the FIFO. If this register matches the lock register, and both are non-zero, then the FIFO is unlocked. |

It will be readily appreciated that many deviations may be made from the specific embodiments disclosed in the specification without departing from the spirit and scope of the invention. In one arrangement, the interface hardware 136 may be configured to determine and send available space in the memory register 176 to the BIOS unit 120 whereupon the available space may be stored in the BIOS unit 120. Accordingly, the interrupt handler 124 may be configured to query the available space before attempting to write data to the write port 174. In this regard, the interrupt handler 124 may write the register metrics to the write port 174 of the interface hardware 136 after determining that the available space is greater than the size of the register metrics to be written.

As mentioned, embodiments disclosed herein can be implemented as one or more computer program products, i.e., one or more modules of computer program instructions encoded on a computer-readable medium for execution by, or to control the operation of, data processing apparatus (processors, cores, etc.). The computer-readable medium can be a machine-readable storage device, a machine-readable storage substrate, a memory device, a composition of matter affecting a machine-readable propagated signal, or a combination of one or more of them. In addition to hardware, code that creates an execution environment for the computer program in question may be provided, e.g., code that constitutes processor firmware, a protocol stack, a database management system, an operating system, or a combination of one or more of them.

Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

We claim:

1. A method for use in managing errors in a computing system, comprising:
   receiving, at a firmware chip of a computing system from a processor of the computing system, at least one interrupt regarding at least one error event of the computing system;
   writing, by the firmware chip, an unlock key to a first port of interface hardware of the computing system;
   reading, by the firmware chip, data regarding the at least one error event stored in one or more memory banks of the computing system;
   writing, by the firmware chip, the error event data to a second port of the interface hardware after the reading;
   writing, by the firmware chip, a lock key to the first port of the interface hardware after writing the error event data to a memory register of the interface hardware, wherein the error event data written to the second port of the interface hardware is available for consumption by a service processor of the computing system for diagnosis of the at least one error event;
   before the writing the unlock key step, receiving, at the firmware chip, the unlock key from a key generator of the computing system;
   writing, by the key generator, the unlock key into the interface hardware; and
   confirming, by the interface hardware, that the unlock key written into the first port by the firmware chip matches the unlock key written into the interface hardware by the key generator, wherein the writing the error event data into the memory register step proceeds based on the confirming step.

2. The method of claim 1, wherein the key generator forms part of the service processor.

3. The method of claim 1, wherein the receiving the unlock key from the key generator step occurs during a booting of an operating system of the computing system by the firmware chip.

4. The method of claim 1, wherein the lock and unlock keys are different.

5. The method of claim 1, further including:
   receiving, at the firmware chip from the interface hardware, an indication of available space in the memory register of the interface hardware, wherein the writing the error event data into the memory register step proceeds after determining that the available space is greater than the size of the error event data.

6. The method of claim 1, further including after the writing the lock key step:
   sending, by the firmware chip, the at least one interrupt to an operating system of the computing system.

7. The method of claim 6, further including:
   reading, by the operating system, the data regarding the at least one error event stored in the one or more memory banks of the computing system; and
   performing, by the operating system, at least one recovery action based on the read data regarding the least one error event.

8. The method of claim 7, wherein the at least one recovery action performed by the operating system is a first recovery action, and wherein the method further includes:
   reading, by the service processor, the error event data written to the memory register of the interface hardware; and
   performing, by the service processor, a second recovery action based on the read data regarding the least one error event.

9. The method of claim 8, wherein the first and second recovery actions are different.

10. The method of claim 1, further including:
queueing the error event data written to the second port into a memory register of the interface hardware.

11. The method of claim 10, wherein the memory register of the interface hardware is a first in first out memory device.

12. A method for use in managing errors in a computing system, comprising:
receiving, at a firmware chip of a computing system from a processor of the computing system, at least one interrupt regarding at least one error event of the computing system;
receiving, at the firmware chip, an unlock key from a key generator of the computing system;
writing, by the firmware chip, the unlock key to a first port of interface hardware of the computing system;
reading, by the firmware chip, data regarding the at least one error event stored in one or more memory banks of the computing system;
writing, by the firmware chip, the error event data to a second port of the interface hardware after the reading; and
writing, by the firmware chip, a lock key to the first port of the interface hardware after writing the error event data to a memory register of the interface hardware,
wherein the error event data written to the second port of the interface hardware is available for consumption by a service processor of the computing system for diagnosis of the at least one error event, and
wherein the receiving the unlock key from the key generator step occurs during a booting of an operating system of the computing system by the firmware chip.

13. The method of claim 12, further including:
writing, by the key generator, the unlock key into the interface hardware; and
confirming, by the interface hardware, that the unlock key written into the lock port by the firmware chip matches the unlock key written into the interface hardware by the key generator,
wherein the writing the error event data into the memory register step proceeds based on the confirming step, and
wherein the key generator forms part of the service processor.

14. The method of claim 12, wherein the lock and unlock keys are different.

15. The method of claim 12, further including:
receiving, at the firmware chip from the interface hardware, an indication of available space in the memory register of the interface hardware, wherein the writing the error event data into the memory register step proceeds after determining that the available space is greater than the size of the error event data.

16. The method of claim 12, further including after the writing the lock key step:
sending, by the firmware chip, the at least one interrupt to an operating system of the computing system.

17. The method of claim 16, further including:
reading, by the operating system, the data regarding the at least one error event stored in the one or more memory banks of the computing system; and
performing, by the operating system, at least one recovery action based on the read data regarding the least one error event.

18. The method of claim 17, wherein the at least one recovery action performed by the operating system is a first recovery action, and wherein the method further includes:
reading, by the service processor, the error event data written to the memory register of the interface hardware; and
performing, by the service processor, a second recovery action based on the read data regarding the least one error event.

19. The method of claim 18, wherein the first and second recovery actions are different.

20. The method of claim 12, further including:
queueing the error event data written to the second port into a memory register of the interface hardware,
wherein the memory register of the interface hardware is a first in first out memory device.

21. A method for use in managing errors in a computing system, comprising:
receiving, at a firmware chip of a computing system from a processor of the computing system, at least one interrupt regarding at least one error event of the computing system;
writing, by the firmware chip, an unlock key to a first port of interface hardware of the computing system;
reading, by the firmware chip, data regarding the at least one error event stored in one or more memory banks of the computing system;
writing, by the firmware chip, the error event data to a second port of the interface hardware after the reading;
writing, by the firmware chip, a lock key to the first port of the interface hardware after writing the error event data to a memory register of the interface hardware,
wherein the error event data written to the second port of the interface hardware is available for consumption by a service processor of the computing system for diagnosis of the at least one error event; and
receiving, at the firmware chip from the interface hardware, an indication of available space in the memory register of the interface hardware, wherein the writing the error event data into the memory register step proceeds after determining that the available space is greater than the size of the error event data.

22. The method of claim 21, further including:
before the writing the unlock key step, receiving, at the firmware chip, the unlock key from a key generator of the computing system;
writing, by the key generator, the unlock key into the interface hardware; and
confirming, by the interface hardware, that the unlock key written into the first port by the firmware chip matches the unlock key written into the interface hardware by the key generator,
wherein the writing the error event data into the memory register step proceeds based on the confirming step, and
wherein the key generator forms part of the service processor.

23. The method of claim 21, wherein the lock and unlock keys are different.

24. The method of claim 21, further including after the writing the lock key step:
sending, by the firmware chip, the at least one interrupt to an operating system of the computing system.

25. The method of claim 24, further including:
reading, by the operating system, the data regarding the at least one error event stored in the one or more memory banks of the computing system; and
performing, by the operating system, at least one recovery action based on the read data regarding the least one error event.

26. The method of claim 25, wherein the at least one recovery action performed by the operating system is a first recovery action, and wherein the method further includes:
reading, by the service processor, the error event data written to the memory register of the interface hardware; and
performing, by the service processor, a second recovery action based on the read data regarding the least one error event.

27. The method of claim 26, wherein the first and second recovery actions are different.

28. The method of claim 21, further including:
queueing the error event data written to the second port into a memory register of the interface hardware,
wherein the memory register of the interface hardware is a first in first out memory device.

29. A method for use in managing errors in a computing system, comprising:
receiving, at a firmware chip of a computing system from a processor of the computing system, at least one interrupt regarding at least one error event of the computing system;
writing, by the firmware chip, an unlock key to a first port of interface hardware of the computing system;
reading, by the firmware chip, data regarding the at least one error event stored in one or more memory banks of the computing system;
writing, by the firmware chip, the error event data to a second port of the interface hardware after the reading;
writing, by the firmware chip, a lock key to the first port of the interface hardware after writing the error event data to a memory register of the interface hardware, wherein the error event data written to the second port of the interface hardware is available for consumption by a service processor of the computing system for diagnosis of the at least one error event; and
sending, by the firmware chip, the at least one interrupt to an operating system of the computing system;
reading, by the operating system, the data regarding the at least one error event stored in the one or more memory banks of the computing system; and
performing, by the operating system, at least one recovery action based on the read data regarding the least one error event.

30. The method of claim 29, further including before the writing the unlock key step:
receiving, at the firmware chip, the unlock key from a key generator of the computing system.

31. The method of claim 30, wherein the receiving the unlock key from the key generator step occurs during a booting of an operating system of the computing system by the firmware chip.

32. The method of claim 29, wherein the lock and unlock keys are different.

33. The method of claim 29, wherein the at least one recovery action performed by the operating system is a first recovery action, and wherein the method further includes:
reading, by the service processor, the error event data written to the memory register of the interface hardware; and
performing, by the service processor, a second recovery action based on the read data regarding the least one error event.

34. The method of claim 33, wherein the first and second recovery actions are different.

35. The method of claim 29, further including:
queueing the error event data written to the second port into a memory register of the interface hardware,
wherein the memory register of the interface hardware is a first in first out memory device.

* * * * *